United States Patent [19]

Nakamura

[11] Patent Number: 5,030,920
[45] Date of Patent: Jul. 9, 1991

[54] METHOD OF DETECTING WEAR OF CUTTING TOOL BY ASCERTAINING A TOOL WORKPIECE CONTACT RESISTANCE

[75] Inventor: Takashi Nakamura, Aichi, Japan

[73] Assignee: Sumitomo Electric Industries, Ltd., Osaka, Japan

[21] Appl. No.: 421,612

[22] Filed: Oct. 13, 1989

[30] Foreign Application Priority Data

Oct. 14, 1988 [JP] Japan ................ 63-259850

[51] Int. Cl.⁵ ............................ B23Q 17/09
[52] U.S. Cl. ..................... 324/721; 73/104; 324/451
[58] Field of Search ............. 73/104; 324/721, 451, 324/694

[56] References Cited

U.S. PATENT DOCUMENTS

| | | | |
|---|---|---|---|
| 3,728,621 | 4/1973 | Frost-Smith et al. | 73/104 |
| 4,207,567 | 6/1980 | Juengel et al. | 73/104 |
| 4,694,686 | 9/1987 | Fildes et al. | 73/104 |
| 4,831,365 | 5/1989 | Thomas et al. | 73/104 |
| 4,945,770 | 8/1990 | Alvelid et al. | 73/104 |

FOREIGN PATENT DOCUMENTS

| | | |
|---|---|---|
| 5252 | 1/1980 | Japan . |
| 138558 | 8/1982 | Japan . |
| 218053 | 9/1987 | Japan . |

Primary Examiner—Kenneth A. Wieder
Assistant Examiner—Maura K. Regan
Attorney, Agent, or Firm—W. G. Fasse; D. H. Kane, Jr.

[57] ABSTRACT

A method for detecting wear of a cutting tool for cutting a workpiece measures the contact resistance between the cutting tool and the workpiece for detecting wear of the cutting tool from a change in the contact resistance, whereby such wear of the cutting tool can be reliably and accurately measured.

6 Claims, 3 Drawing Sheets

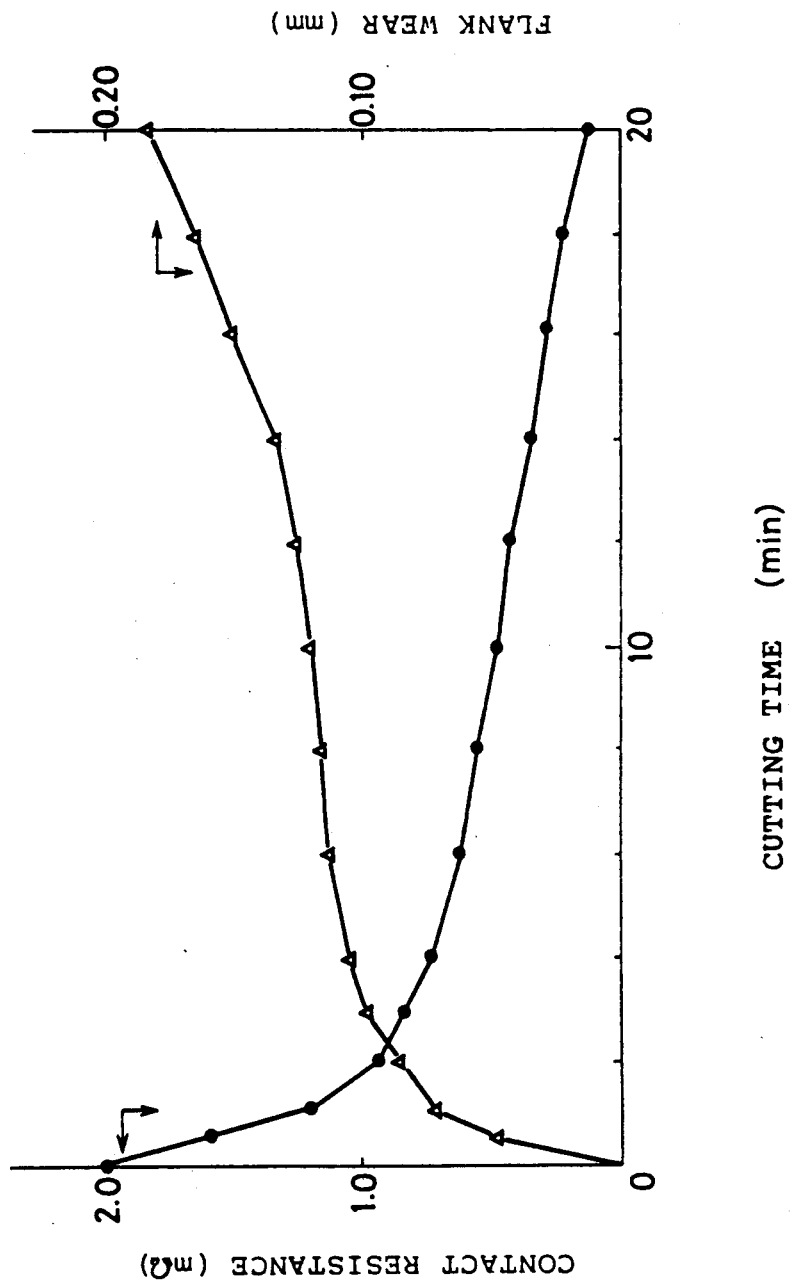

METHOD OF DETECTING WEAR OF CUTTING TOOL BY ASCERTAINING A TOOL WORKPIECE CONTACT RESISTANCE

FIELD OF THE INVENTION

The present invention relates to a method for measuring wear of a cutting tool during a cutting operation by calculating a contact resistance between tool and workpiece.

BACKGROUND INFORMATION

In a generally known method of measuring wear of a cutting tool during cutting work, acoustic emission (AE) is utilized as disclosed in Japanese Patent Laying-Open Gazette No. 138558/1982, for example. This AE method is adapted to detect with an HE-Sensor acoustic emission generated during the cutting work when a cutting tool breaks thereby to measure wear thereof. However, it is impossible to accurately detect only such acoustic emission since various noises are made on the jobsite where the actual cutting work is performed. Thus, the AE method is insufficient in accuracy.

Another conventional method is adapted to measure wear by measuring the cutting force caused during cutting work, as disclosed in Japanese Patent Laying-Open Gazette No. 5252/1980 or 218053/1987, for example. However, such cutting force varies with the configurations of the cutting positions of the workpieces etc. Thus, this method is not usable unless all the workpieces are regularly cut to have the same configuration.

In still another conventional method, a cutting tool is formed of a material containing a radioactive isotope such as radioactive cobalt, and a reduction of the radioactive isotope is measured through change its radioactivity, thereby to detect wear of the cutting tool. However, it is clear that such a method is not desirable, because the radiation may be harmful to the work environment.

SUMMARY OF THE INVENTION

It is an object of the present invention to provide a method which can accurately and reliably detect the wear of a cutting tool without any influence by disturbance factors such as noise in the work environment, dispersion in the hardness of the workpiece, or the configuration of workpieces, etc.

The present method of detecting or determining wear comprises steps of measuring or ascertaining the contact resistance between a cutting tool and a workpiece and determining wear of the cutting tool from the measured or ascertained contact resistance.

The material of which the cutting tool is made, is not particularly restricted in the present invention, thus a tool insert may be made of cemented carbide or coated by cemented carbide, for example.

According to the present invention, the contact resistance between a cutting tool and a workpiece may be measured by measuring electrical resistance, for example, by the so-called four terminal method.

The principle of the present invention, in which wear can be detected by measuring contact resistance, will now described. Assuming that a represents the radius of a contact point between two conductors A and B, contact resistance R between the conductors A and B is expressed as follows:

$$R = \frac{\rho}{2a}$$

where $\rho$ represents resistivity.

Such contact resistance, which is caused since a current fed from a wide passage is abruptly narrowed at the contact point, is called spreading resistance.

As cutting work progresses wear of a cutting tool increases, the area of the contact point between the cutting tool and a workpiece also increases. Thus, the contact resistance between the cutting tool and the workpiece is reduced. Therefore, the wear of the cutting tool can be evaluated by measuring the contact resistance.

In general, the contact point between the cutting tool and the workpiece is heated to an extremely high temperature of 500° to 1000° C. during the cutting work. Therefore, a thermoelectromotive force Et is generated between the cutting tool and the workpiece. Further, a potential Em measured between the cutting tool and the workpiece includes this thermoelectromotive force Et. Hence, the contact resistance R between the cutting tool and the workpiece can be calculated as follows:

$$R = \frac{Em - Et}{I}$$

where I represents the current flowing between the cutting tool and the workpiece when a respective circuit is closed.

The aforementioned thermoelectromotive force Et can be detected by interrupting the current flowing between the cutting tool and the workpiece and measuring the potential between the tool and the workpiece.

A preferred embodiment of the present invention comprises steps of feeding a current between a cutting tool and a workpiece to ascertain the potential developed across the cutting tool and the workpiece and the current value, interrupting the current flowing between the cutting tool and the workpiece to calculate the thermoelectromotive force generated by contact between the cutting tool and the workpiece, calculating the contact resistance between the cutting tool and the workpiece by subtracting the thermoelectromotive force from the measured potential and dividing the result by the current value, and detecting wear of the cutting tool from the calculated contact resistance.

According to the present method, the wear of a cutting tool can be reliably and accurately measured during the cutting work on the workpiece, with an extremely simple apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a graph showing the relationship between the contact resistance and the flank wear.

DESCRIPTION OF THE PREFERRED EMBODIMENT AND THE BEST MODE OF THE INVENTION

Figure 1:
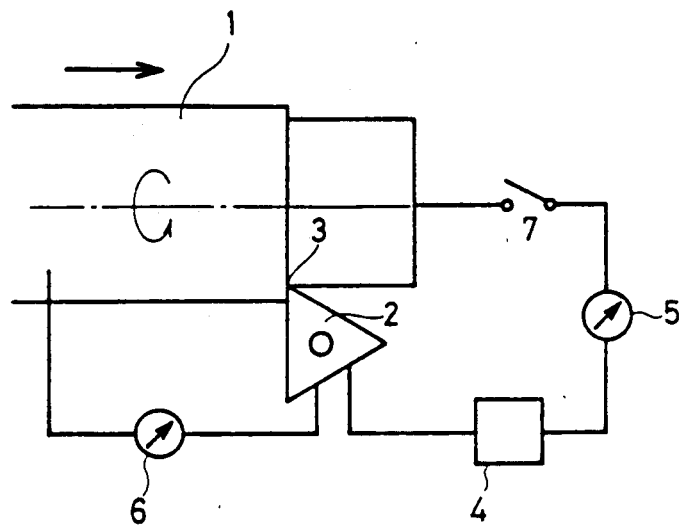
FIG. 1 is a circuit diagram showing an embodiment of the present detecting method.

Referring to FIG. 1, a workpiece 1 is cut by a tool insert 2, which serves as a cutting tool. The workpiece 1 is in contact with the insert 2 at a contact point 3. A power source 4 is connected between the insert 2 and the workpiece 1, and this power source 4 is connected to the workpiece 1 through an ampere meter 5 and a switch 7. Further, a voltmeter 6 is connected for measuring the potential between the insert 2 and the workpiece 1. When the switch 7 is closed that, a current from the power source 4 flows between the workpiece 1 and the insert 2. The ampere meter 5 displays the respective current value at this time, and the voltmeter 6 indicates the potential between the workpiece 1 and the insert 2. An operator can make a notation of these readings.

Then the switch 7 is opened to interrupt the current flowing between the workpiece 1 and the insert 2. In this state with the switch 7 open, the voltmeter 6 permits reading the potential which corresponds to the thermoelectiomotive force between the workpiece 1 and the insert 2, whereby an operator can write down the thermoelectromotive force Et. The contact resistance R can now be calculated in accordance with the above equation by subtracting the thermoelectromotive force Et from the potential Em developed across the workpiece 1 and the insert 2 when the current flows from the power source 4, and dividing the result by the current value I read from the ampere meter 5. A simple pocket calculator can be used for this purpose, for example.

Examples of inserts were prepared from AC10 and ST15E of type No. TNMN160408 by Sumitomo Electric Industries, Ltd. to cut workpieces of S45C with holders of FN21R-44A, and the relationships between the cutting length and the contact resistance values were measured with the apparatus shown in FIG. 1. The cutting conditions were as follows:
Cutting Velocity: 100 m/min.
Feed Rate: 0.30 mm/rev.
Depth of Cut: 2 mm The first insert of AC10 was formed of cemented carbide coated with a second coating of aluminum oxide on a first coating of TiC. The second insert of ST15E was formed of general cemented carbide of grade P20 under ISO standards without coating.

Figure 2:
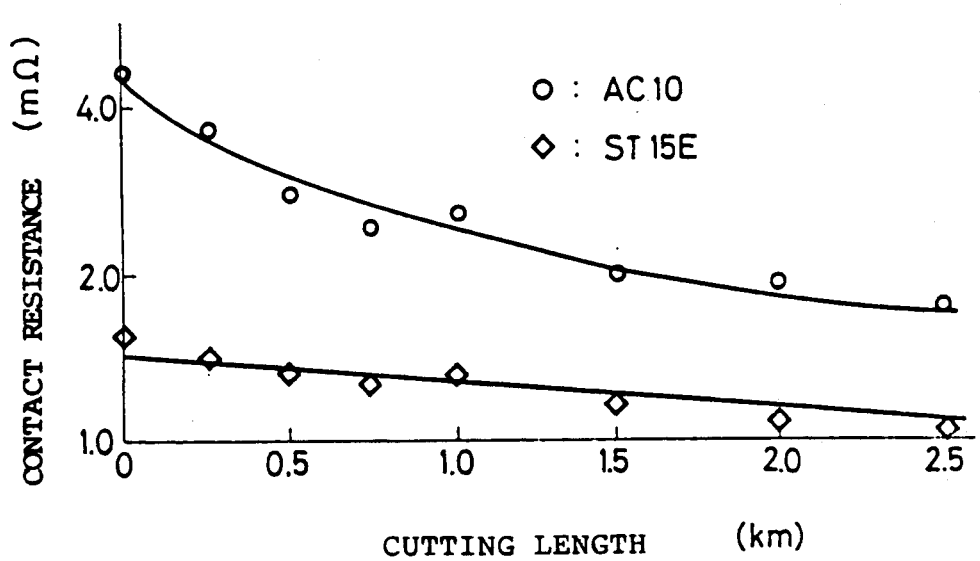
FIG. 2 illustrates the relationship between contact resistance values and cutting distances in the embodiment of the present invention.

FIG. 2 shows the relationships between the contact resistance values and the cutting length thus measured. As is clear from FIG. 2, the coated insert of cemented carbide AC10 exhibits a remarkable effect as compared with that of the second uncoated cemented carbide of ST15E.

As shown in FIG. 2, the contact or spreading resistance of the coated insert AC10 is more than three times higher than that of the uncoated insert ST15E, especially at the beginning of a cutting operation.

The first insert prepared from AC10 of type No. CNMG120408N-UG by Sumitomo Electric Industries, Ltd. was used to cut a workpiece of S45C with a holder of PCLNR2525-43. The first insert of AC10 was a cemented carbide coated with a second coating of aluminum oxide on a first coating of TiC, similarly to the above. The second insert was made of ST15E as set forth above. The cutting conditions were as follows:

Cutting Velocity: 250 m/min.
Feed Rate: 0.36 mm/rev.
Depth of Cut: 2 mm

With a switch corresponding to switch 7 closed, a direct current of 5 A was fed through the insert and the workpiece in an apparatus which was similar to the apparatus shown in FIG. 1, to measure the potential Em across the tool workpiece contact point. Further, the switch of the apparatus was opened once during every contact operations period to measure the thermoelectromotive force Et, thereby to obtain the potential difference Em-Et developed during a cutting operation.

Figure 3:
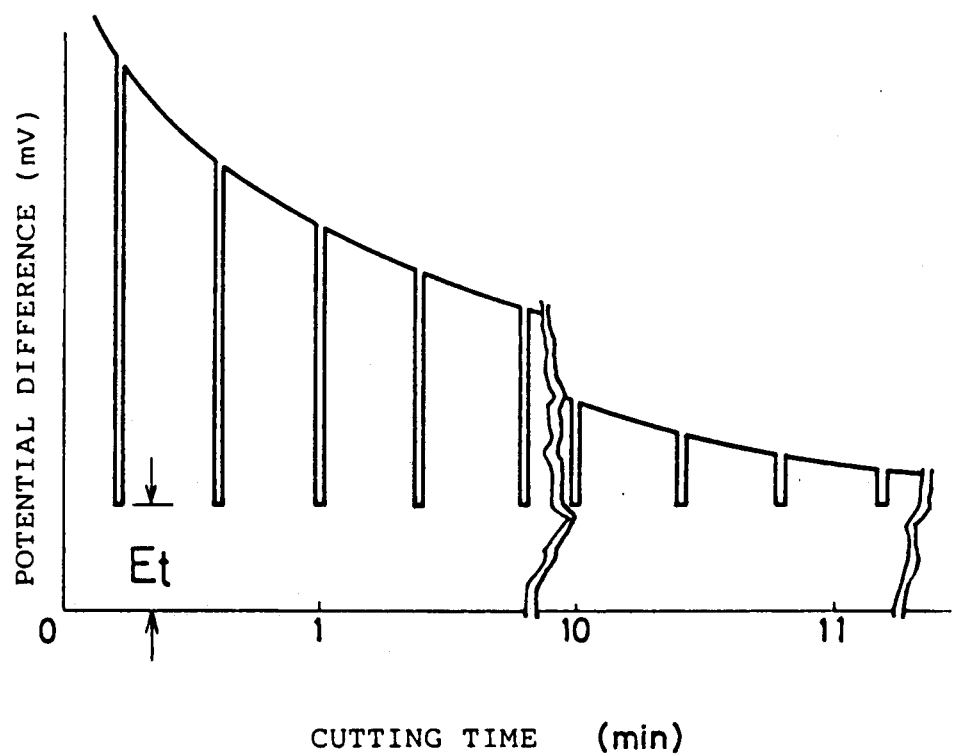
FIG. 3 is a chart showing the change in the potential difference in the embodiment of the present invention.

FIG. 3 is a chart showing the change of the potential difference thus measured. As shown in FIG. 3, the potential difference was abruptly reduced every at each constant period, interval in correspondence to the opening of the switch 7. The electromotive force Et measured when the switch 7 was open corresponds to the thermoelectromotive force.

Thus, the potential difference was calculated for ascertaining the thermoelectromotive force Et and the contact resistance.

FIG. 4 shows the change of the contact resistance thus evaluated.

An insert absolutely identical to that of the above embodiment was employed to cut a workpiece under the same conditions, thereby to evaluate flank wear for every constant cutting period. FIG. 4 shows the results obtained and indicates that there are constant relations between the contact resistance values and the flank wear values. Thus, wear of an insert can be evaluated by measuring the contact resistance according to the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of detecting wear of a cutting tool for cutting a workpiece, comprising the following steps:
   (a) coating said cutting tool with a coating layer having a high tool workpiece contact resistance compared to an uncoated tool for an improved detection of wear;
   (b) feeding an electric current through said coated cutting tool and said workpiece;
   (c) measuring a potential (Em) developed across said cutting tool and said workpiece while said electric current is flowing;
   (d) measuring said electric current during a cutting operation;
   (e) interrupting said electric current flowing between said cutting tool and said workpiece;
   (f) measuring, while said electric current is interrupted, a thermoelectromotive force (Et) generated by contact between said cutting tool and said workpiece;
   (g) subtracting said thermoelectromotive force (Et) from said potential (Em) and dividing the potential difference by said current value for ascertaining said contact resistance between said cutting tool and said workpiece; and
   (h) determining wear of said cutting tool from said contact resistance.

2. The method in accordance with claim 1, wherein said coating step is performed by first applying a coating of titanium carbide to said cutting tool and then applying a coating of aluminum oxide on said titanium carbide coating.

3. The method in accordance with claim 1, wherein said cutting tool is made of cemented carbide.

4. The method in accordance with claim 1, wherein said ascertaining of said contact resistance is performed by a four terminal method.

5. The method of claim 1, wherein said coating step is performed by applying an aluminum oxide coating to said tool.

6. The method of claim 1, wherein said coating step is performed by applying a titanium carbide coating to said tool.

* * * * *